Patented Mar. 6, 1923.

1,447,557

UNITED STATES PATENT OFFICE.

DAVID ALLISTON LEGG, OF LONDON, ENGLAND, ASSIGNOR TO MATTHEWS ATKINSON ADAM, OF LONDON, ENGLAND.

REDUCTION OF NITROCOMPOUNDS.

No Drawing.   Application filed December 22, 1920.   Serial No. 432,605.

*To all whom it may concern:*

Be it known that I, DAVID ALLISTON LEGG, a subject of the King of Great Britain and Ireland, and residing at 17 Pepys Road, Raynes Park, London, S. W. 19, England, have invented certain new and useful Improvements in and Relating to the Reduction of Nitrocompounds, of which the following is a specification.

This invention relates to the reduction of nitro-compounds in the presence of a catalyst for the purpose of manufacturing amino-compounds.

It is well known that if mixtures of nitro-compounds and hydrogen or other reducing gases are passed over certain catalysts at temperatures sufficiently high to maintain the substances in the vapour state, reduction to the corresponding amino-compounds takes place.

Catalysts previously proposed include copper reduced from various compounds, silver and gold, nickel, or these catalysts together with certain activators.

I have found that there are certain disadvantages incidental to the use of these catalysts, for example:—

1. They are not readily and consistently obtained in an active state, being decidedly subject to variation in activity according to the care bestowed on their preparation.

2. They are very subject to poisoning by catalyst poisons in the gases or to rapid loss of activity unless temperature control is very definite. This failing is probably accentuated by the fine division of the material.

3. They are usually of more or less complicated nature and deposited on some form of inert carrier which renders difficult the final recovery or regeneration of the catalytic material.

4. Being generally in a finely divided state, they are liable to fall from their carrier, thus being withdrawn from the sphere of action.

5. They are sometimes too energetic in action inducing undesirable side reactions.

6. They require high working temperatures and pressures.

7. They have not sufficient activity to make their practical use feasible.

One or more of the above objections applies to all previously described catalysts. The present form of catalyst is entirely free from most of the above objections, and possesses the other objections in very slight degree only.

The object of the present invention is to provide a method of reducing nitro-compounds by catalysis to amino-compounds free of the above disadvantages.

I have found by experiments that when nitro-compounds are mixed with hydrogen, water-gas or other reducing gases and passed over fused copper oxide prepared as indicated in British patent application No. 21,667 of 1919 that is, fusing cupric oxide or a substance capable of producing cupric oxide on heating, after which the product is cooled and broken into pieces (with or without preliminary reduction) at temperatures sufficient to maintain the substances in the vapour state, or in the case of a liquid having a low boiling point over the aforesaid catalyst maintained at a suitable higher temperature, the nitro-compounds are reduced to the corresponding amino-compounds, good yields being obtained.

My invention therefore consists in reducing nitro-compounds by catalysis to amino-compounds by passing the nitro-compounds in the vapour state in conjunction with a reducing agent in contact with a copper catalyst prepared by fusing cupric oxide or a body capable of producing cupric oxide on heating, cooling the fused mass and breaking it into pieces, and when I refer in this specification or claims to cupric oxide I include also such bodies referred to above as produce cupric oxide on heating.

The invention specifically includes the reduction of nitro-benzene to aniline by passing the vapour of nitro-benzene together with a reducing gas in contact with a copper catalyst prepared according to the application numbered as above.

The invention also consists in reducing nitro-compounds by catalysis to amino-compounds on the lines indicated above, in which the reducing gas is formed during the reaction by admixture of the nitro-compound to be reduced with a body capable of being dehydrogenated under conditions suitable for the reduction of the nitro-compound.

In carrying my invention into effect in one form by way of example as applied to the reduction of nitrobenzene to aniline, I first prepare a catalyst according to the British application No. 21,667 of 1919. Briefly stated, the process consists in fusing black copper oxide or substances capable of yielding this, the mass being subsequently cooled, and if desired, broken into lumps or powder. When prepared in this way the resultant fused oxide is quite distinct in physical character from the ordinary granular or black oxide and consists of a more or less crystalline and usually slightly porous mass of considerable density; it is usually reddish-black in colour when fractured.

In one experiment I packed copper oxide prepared in this way in a copper tube 3 feet 6 inches long by ¾ inch diameter, the catalyst occupying 26 inches at the middle part of the tube. The temperature was raised by means of a gas furnace to 230° C. and nitrobenzene allowed to drip into the tube at one end, hydrogen gas being passed through the tube at the same time. The rate of feed of the nitrobenzene, in order to obtain practically complete reduction, was about 80 cubic centimetres per hour at the start and this I reduced to 55 cubic centimetres after about 96 hours running. I maintained the production of aniline over a period of 120 hours and the catalyst was not then poisoned or destroyed. The main fall in activity took place during the first 24 hours, the activity being practically constant for the last 48 hours.

The hydrogen was regulated so that there was an excess, the result being that the aniline distilling over was colourless. A deficiency of hydrogen may lead to the production of azobenzene, which will be indicated by the bright orange colour of the product.

During this experiment a quantative test was made, and the yield of aniline found to be practically theoretic.

The above experiment was continued for 244 hours, at the end of which time the rate of conversion had fallen to 33 cubic centimetres per hour the temperature being maintained at 230° C. 150 cubic centimetres forming a sample averaged from the aniline oil obtained during the whole period of the experiment was fractionated with the following results:—

Up to 110° C. there distilled over 8 ccs. (4 ccs. aqueous layer and 4 ccs. oil layer).
Between 110° and 182° C. there distilled over _____ 2 ccs.
Between 182° and 184° C. there distilled over _____ 135 ccs.
Residue still distilling at 184° C___ 4 ccs.
_____
149 ccs.

This shows a high degree of purity of the product and lack of reduced compounds having a high boiling point, e. g. cyclohexylaniline because almost entirely the whole bulk distilled at a temperature not greater than 184° C., which is the boiling point of aniline.

The details given above are by way of example only, thus it is not necessary to work at the temperature stated, as there is a large range which may be employed, say between 180 and 300° C. In the case of nitrobenzene temperatures as low as 180° C. can be used after the process is started, as the production of water vapour in the reaction lowers the temperatures at which the substances will remain in the vapour state.

Nitrotoluenes can be reduced to toluidines in a similar manner.

In carrying this invention into effect as a reducer any reasonably pure hydrogen or other reducing gas can be employed. I have found by mixing the nitro-compound to be reduced with an alcohol which is capable of being dehydrogenated under the conditions as indicated above suitable for the reduction of the nitro-compound that hydrogen removed from the alcohol immediately combines with the oxygen of the nitro-compound and that alcohols therefore can be employed as the source of hydrogen, for producing the required amino-compound. Since the reduction of nitro-compounds is exothermic and the dehydrogenation of alcohols endothermic, when once the materials are raised to the reacting temperature and the reaction started the heat evolved in the exothermic reaction will assist in supplying that required for the endothermic reaction. In some cases, theoretically, the heat available from the exothermic reaction is more than sufficient to supply all necessary for the endothermic reaction, but in practice owing to radiation losses and other losses incidental to the use of ordinary commercial plant, it is usually necessary to supply some heat.

As an example of a process in which the hydrogen is employed in the form referred to above, I have found that on passing a mixture of secondary butyl alcohol and nitro-benzene (mono-nitrobenzene) in the proportion of three parts of the alcohol to one of nitrobenzene by weight over a copper catalyst prepared as indicated in the British application No. 21667 of 1919 at a temperature of 270° C. there was formed a mixture of methyl ethyl ketone and aniline. The ultimate equation of the reaction is as follows:—

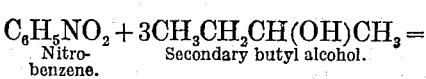
Nitrobenzene.        Secondary butyl alcohol.

Aniline.        Methyl ethyl ketone.

In employing alcohols as a source of hydrogen it must be borne in mind that secondary reactions may occur between the products of dehydrogenation and reduction, e. g. if methyl alcohol and nitrobenzene were used combination would occur between the formaldehyde and aniline produced.

I have found that the catalyst as described used in the reduction of nitro-compounds to amino-compounds does not readily become inactivated and that when after extended use it does become inactivated, its activity can be restored by superficial re-oxidation by heating in air to a high temperature. The catalyst also has the advantage that it may be finally recovered in massive form as practically pure copper and it may be prepared from any form of copper oxide irrespective of its fine chemical quality or catalytic activity.

References made above to copper catalysts include all improved catalysts indicated in the British application No. 21,667 of 1919.

Having now described my invention, what I claim as new and desire to secure by Letters Patent is:—

1. A method of reducing nitro-compounds by catalysis to amino-compounds which consists in passing the nitro-compound in a state of vapour in conjunction with a reducing agent in contact with a copper catalyst prepared by fusing cupric oxide, cooling the fused mass and breaking it into pieces.

2. A method for reducing nitro-benzene to aniline which consists in passing the vapour of nitro-benzene together with a reducing gas in contact with a copper catalyst prepared by fusing cupric oxide, cooling the fused mass and breaking it into pieces.

3. A method of reducing nitro-compounds by catalysis to amino compounds which consists in passing the nitro-compound in a state of vapour in conjunction with a body which is capable of being dehydrogenated under the conditions suitable for the reduction of the nitro-compound in contact with a copper catalyst prepared by fusing cupric oxide, cooling the fused mass and breaking it into pieces.

In testimony whereof I have signed my name to this specification.

DAVID ALLISTON LEGG.